(12) United States Patent
Wang

(10) Patent No.: US 9,990,065 B2
(45) Date of Patent: Jun. 5, 2018

(54) COLOR FILTER SUBSTRATE, LIQUID CRYSTAL MODULE AND TOUCH DISPLAY DEVICE

(71) Applicants: BOE TECHNOLOGY GROUP CO., LTD., Beijing (CN); BOE (HEBEI) MOBILE DISPLAY TECHNOLOGY CO., LTD., Gu'An, Hebei (CN)

(72) Inventor: Dapeng Wang, Beijing (CN)

(73) Assignees: BOE TECHNOLOGY GROUP CO., LTD., Beijing (CN); BOE (HEBEI) MOBILE DISPLAY TECHNOLOGY CO., LTD., Gu'An, Hebei (CN)

( * ) Notice: Subject to any disclaimer, the term of this patent is extended or adjusted under 35 U.S.C. 154(b) by 48 days.

(21) Appl. No.: 14/761,439

(22) PCT Filed: Nov. 28, 2014

(86) PCT No.: PCT/CN2014/092480
§ 371 (c)(1),
(2) Date: Jul. 16, 2015

(87) PCT Pub. No.: WO2016/008252
PCT Pub. Date: Jan. 21, 2016

(65) Prior Publication Data
US 2016/0252987 A1    Sep. 1, 2016

(30) Foreign Application Priority Data

Jul. 15, 2014  (CN) .......................... 2014 1 0334976

(51) Int. Cl.
*G06F 3/041*   (2006.01)
*G02F 1/1333*  (2006.01)
*G02F 1/1335*  (2006.01)

(52) U.S. Cl.
CPC .......... *G06F 3/041* (2013.01); *G02F 1/13338* (2013.01); *G02F 1/133305* (2013.01);
(Continued)

(58) Field of Classification Search
CPC ........... G02F 1/133305; G02F 1/13338; G02F 1/133512; G02F 1/133514;
(Continued)

(56) References Cited

U.S. PATENT DOCUMENTS

2005/0237467 A1* 10/2005 Takaishi .............. G02F 1/13452
                                                        349/149
2009/0278813 A1* 11/2009 Wijaya .................... G06F 3/041
                                                        345/173

(Continued)

FOREIGN PATENT DOCUMENTS

CN       102466907 A      5/2012
CN       102467289 A      5/2012

(Continued)

OTHER PUBLICATIONS

Third Chinese Office Action dated Mar. 28, 2016; Appln. No. 201410334976.2.

(Continued)

*Primary Examiner* — Hong Zhou
(74) *Attorney, Agent, or Firm* — Ladas & Parry LLP

(57) ABSTRACT

A color filter substrate (2), a liquid crystal module and a display device are disclosed. The color filter substrate includes a touch flexible printed circuit binding area (3) for binding a touch flexible printed circuit; and a black matrix area (4) light shielding; the touch flexible printed circuit binding area (3) and the black matrix area (4) are two areas separate from each other and have no overlapping or partially overlapping parts therebetween; and a bottom of the touch flexible printed circuit binding area (3) is transparent.

(Continued)

The color filter substrate (2), the liquid crystal module and the display device enable the binding conditions and the state of conducting particles to be monitored from backside, so that product yield is improved and accident rate is reduced.

18 Claims, 1 Drawing Sheet

(52) U.S. Cl.
CPC .. *G02F 1/133512* (2013.01); *G02F 1/133514* (2013.01); *G02F 1/133528* (2013.01); *G06F 3/0412* (2013.01); *G02F 2001/133388* (2013.01); *G06F 2203/04102* (2013.01); *G06F 2203/04103* (2013.01)

(58) Field of Classification Search
CPC ... G02F 1/133528; G02F 2001/133388; G06F 2203/04102; G06F 3/041; G06F 2203/04103; G06F 3/0412
USPC ............... 345/87, 104, 173; 349/106, 110
See application file for complete search history.

(56) References Cited

U.S. PATENT DOCUMENTS

| | | | |
|---|---|---|---|
| 2012/0105337 A1 | 5/2012 | Jun et al. | |
| 2012/0105344 A1 | 5/2012 | Ko et al. | |
| 2012/0257132 A1* | 10/2012 | Kitajima | G02F 1/133512 349/42 |
| 2014/0009400 A1* | 1/2014 | Poorter | G06F 3/041 345/173 |
| 2014/0043546 A1* | 2/2014 | Yamazaki | G02F 1/13338 349/12 |
| 2014/0176853 A1* | 6/2014 | Wang | G02F 1/133308 349/58 |
| 2014/0218639 A1* | 8/2014 | Lin | G02F 1/13338 349/12 |

FOREIGN PATENT DOCUMENTS

| | | |
|---|---|---|
| CN | 103365470 A | 10/2013 |
| CN | 103529578 A | 1/2014 |
| CN | 104102383 A | 10/2014 |

OTHER PUBLICATIONS

International Search Report Appln. No. PCT/CN2014/092480; dated Apr. 22, 2015.
Written Opinion of the International Searching Authority Appln. No. PCT/CN2014/092480; dated Apr. 22, 2015.
First Chinese Office Action Appln. No. 201410334976.2; dated Jul. 13, 2015.
Second Chinese Office Action dated Jan. 20, 2016: Appln. No. 201410334976.2.

* cited by examiner

COLOR FILTER SUBSTRATE, LIQUID CRYSTAL MODULE AND TOUCH DISPLAY DEVICE

TECHNICAL FIELD

Embodiments of the present invention relate to a color filter substrate, a liquid crystal module, and a touch display device.

BACKGROUND

At present, on-cell touch control technologies are becoming popular. In an on-cell touch screen, touch sensors are interposed between the color filter substrate and the polarizer sheet of the display screen so as to provide the liquid crystal panel with touch sensors. In technologies for display screen, a liquid crystal module usually includes an upper polarizer sheet, a color filter substrate (including a black matrix (a shielding area)), liquid crystal, an array substrate, a lower polarizer sheet and a backlight module.

SUMMARY

At least one embodiment of the present invention provides a color filter substrate, a liquid crystal module and a touch display device, which enable a TFPC to be bound onto glass and thus achieve a TFOG (Touch FPC On Glass) structure, so that yield is improved and loss is reduced.

At least one embodiment of the present invention provides a color filter substrate, including: a touch flexible printed circuit binding area for binding a touch flexible printed circuit, and a black matrix light shielding, wherein the touch flexible printed circuit binding area and the black matrix area are two areas separate from each other and have no overlapping or partially overlapping parts therebetween; and a bottom of the touch flexible printed circuit binding area is transparent.

For example, the color filter substrate comprises a transparent base substrate and the bottom of the touch flexible printed circuit binding area is transparent.

At least one embodiment of the present invention further provides a liquid crystal module, which includes any of the above-mentioned color filter substrates.

For example, the liquid crystal module further includes an array substrate disposed opposite to the color filter substrate, wherein the area of the array substrate corresponding to the touch flexible printed circuit binding area is transparent and configured with no circuits.

For example, the array substrate includes a transparent base substrate.

For example, the liquid crystal module further includes: a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located; the first and second polarizer sheets have no areas that overlap or partially overlap the touch flexible printed circuit binding area.

At least one embodiment of the present invention further provides a touch display device, which includes any of the above-mentioned liquid crystal modules.

BRIEF DESCRIPTION OF DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

REFERENCE NUMERALS

1: array substrate; 2: color filter substrate; 3: TFPC binding area; 4: black matrix (BM) area; 5: integrated circuit (IC); 6: panel FPC binding area; 7 display area (AA area); 8: backlight shielding area.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the embodiments to be described are only some, not all, of the embodiments of the present invention. Based on the described embodiments herein, those skilled in the art can obtain other embodiment(s), without any inventive work, which should be within the scope of the invention.

In the preparation of a liquid crystal module for a touch screen, the technical process for binding of a touch flexible printed circuit (TFPC) is confronted with the following problems. In the on-cell touch control technology, a TFPC is bound onto an upper layer of a color filter substrate. In this case, an ordinary microscope cannot be used to monitor the FPC binding conditions by bypassing the FPC and the pins (for example gold fingers); even if an infrared microscope is used, dislocation can barely be observed, while the state of conducting particles cannot be obtained. As a result, in the technical process for TFPC binding, FPC binding conditions can be monitored from neither side due to the structure with the FPC as an upper layer and a black matrix area as a lower layer. The quality of the TFPC binding process cannot be guaranteed if fabrication is carried out without testing and monitoring. That means a huge risk because there will be heavy loss if something is wrong in the binding.

Figure 1:
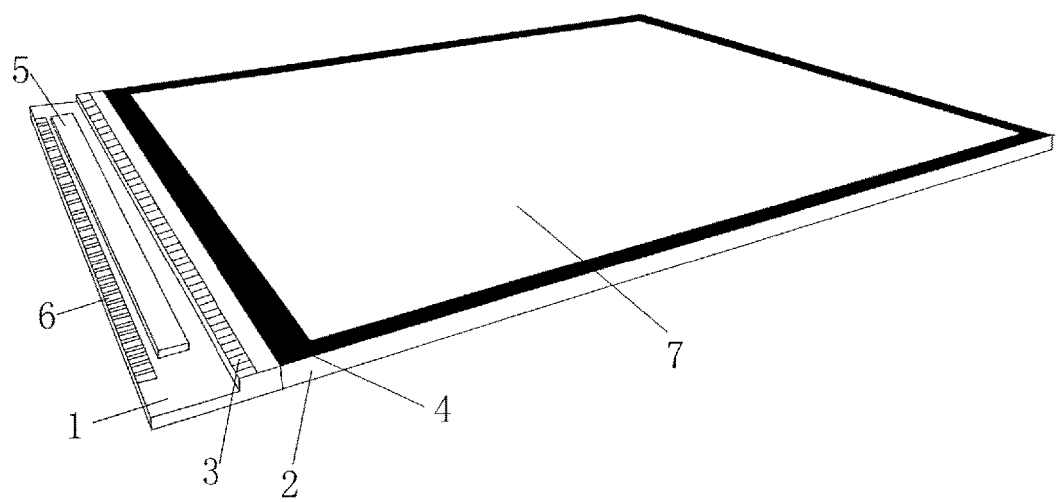
FIG. 1 is a structure diagram of a liquid crystal module according to one embodiment of the present invention.

FIG. 1 is a structure diagram of a liquid crystal module according to an embodiment of the present invention. As shown in FIG. 1, the embodiment provides a color filter substrate, which includes a touch flexible printed circuit (TFPC) binding area 3 and a black matrix (BM) area 4.

The TFPC binding area 3 is configured to bind a flexible printed circuit and has a transparent bottom, while the BM area 4 is configured for light shielding, for example, for defining sub-pixel areas, etc.

The TFPC binding area 3 and the BM area 4 are two areas separate from each other and have no overlapping or partially overlapping parts. The bottom of the TFPC area is transparent.

For example, the color filter substrate 2 may adopt a glass substrate as a base substrate, so that the TFPC binding area 3 may employ transparent glass as its bottom. For another example, the color filter substrate 2 may use other transparent base substrate as well, such as a plastic substrate, and in this case the bottom of the TFPC binding area 3 is still transparent.

In contrast to a color filter substrate without a TFPC binding area, the glass color filter substrate in the present embodiment is prolonged, and the prolonged portion is configured for binding the touch flexible printed circuit, while the size of the BM area 4 remains unchanged. That is to say, the black matrix is formed, on the base substrate for the color filter substrate, with its size in the lengthwise direction being smaller than that of the base substrate (for example a glass substrate) so as to preserve a binding position for the FPC and ensure the bottom to be transparent glass.

In the on-cell touch structure in the embodiment of the present invention, the bottom of the bound TFPC is transparent and is not obstructed by the black matrix, so that the binding conditions and the state of conducting particles can be monitored from backside by means of, for example, an ordinary microscope. As a result, the yield of touch TFOGs is greatly improved, the previously uncontrollable production becomes under control, and the accident rate is reduced to a great extent and thus undesired quality accidents are avoided.

At least one embodiment of the present invention further provides a liquid crystal module, which includes the color filter substrate in the above-mentioned embodiment.

For example, the liquid crystal module further includes an array substrate (for example a thin film transistor (TFT) array substrate) 1, which is disposed opposite to the color filter substrate 2. The area on the array substrate 1 corresponding to the TFPC binding area 3 is transparent and configured without any light blocking structures, such as circuits.

For example, the array substrate 1 may use a glass substrate or other transparent substrate as a base substrate.

That is to say, the circuit design of the array substrate should avoid positions corresponding to the TFPC binding area to enable the binding conditions of the TFPC to be monitored.

Moreover, the liquid crystal module further includes an upper polarizer sheet and a lower polarizer sheet. The upper polarizer sheet is disposed opposite to the color filter substrate 2 and located on the outer side with respect to the color filter substrate 2, that is, compared with the inner side, on which the array substrate is located.

The lower polarizer sheet is disposed opposite to the array substrate 1 and located on the outer side with respect to the array substrate 1, that is, compared with the inner side, on which the CF substrate is located.

The upper and lower polarizer sheets have no areas that overlap or partially overlap the TFPC binding area 3.

That is to say, the TFOG position is reserved in the lengthwise direction of the upper and lower polarizer sheets and the T FOG area is covered by neither of the polarizer sheets on the side of the color filter substrate side and the side of the array substrate.

Moreover, the liquid crystal module further includes an integrated circuit 5, a panel FPC binding area 6 and a display area (AA area) 7.

Figure 2:
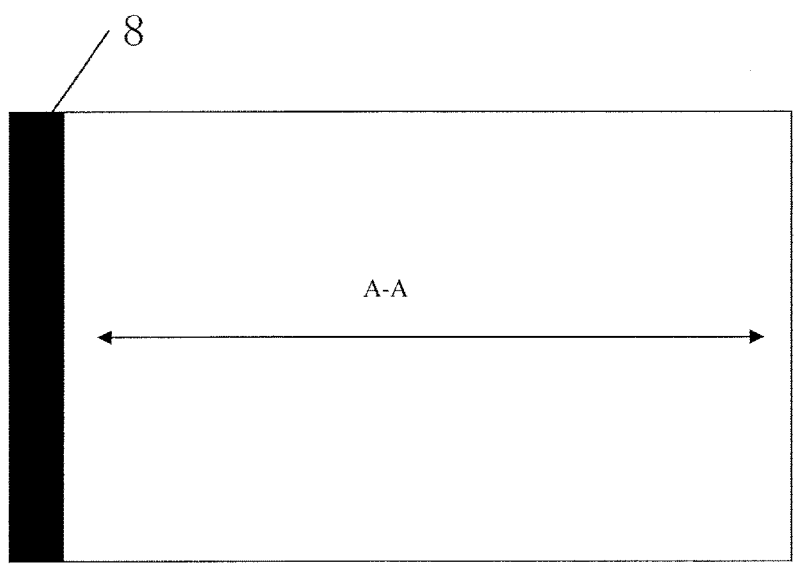
FIG. 2 is a structure diagram of a backlight of a liquid crystal module according to one embodiment of the present invention.

As shown in FIG. 2, a backlight shielding area 8 is adjusted according to the panel display area (AA area), so that the width of the shielding area in the lengthwise direction is increased to ensure that the liquid crystal module has no light leakage and the size of the AA area remains unchanged. The backlight shielding area 8 may be implemented with a black tape or a black matrix material.

At least one embodiment of the present invention provides a touch display device, which includes any of the above-mentioned liquid crystal modules. The touch display device includes a cellphone, a e-book, a notebook computer, a tablet, a watch or any other electronic display product.

What are described above is related to the illustrative implementations of the invention only and not limitative to the scope of the invention; the scopes of the invention are defined by the accompanying claims.

The present application claims priority of China patent application No. 201410334976.2 filed on Jul. 15, 2014, which is incorporated herein in its entirety by reference as a part of the present application.

The invention claimed is:

1. A color filter substrate, comprising: a touch flexible printed circuit binding area configured for binding a touch flexible printed circuit; and
    a black matrix area configured for light shielding;
    wherein the color filter substrate comprises a display region and a peripheral region surrounding the display region, the touch flexible printed circuit binding area and the black matrix area are located in the peripheral region, and the touch flexible printed circuit binding area and the black matrix area are two areas separate from each other and have no overlapping or partially overlapping parts therebetween; and a part of the color filter substrate between the touch flexible printed circuit binding area and a surface of the color filter substrate opposite to the touch flexible printed circuit binding area is entirely transparent such that the touch flexible printed circuit binding area can be monitored from an opposite side of a side of the touch flexible printed circuit binding area which is configured for binding the touch flexible printed circuit,
    the touch flexible printed circuit binding area extends along an edge of the color filter substrate, the color filter substrate further comprises two opposite edges intersecting, with the edge, and two ends of the touch flexible printed circuit binding area respectively extends to the two opposite edges of the color filter substrate.

2. The color filter substrate of claim 1, wherein the color filter substrate comprises a transparent base substrate and the bottom of the touch flexible printed circuit binding area is transparent.

3. A liquid crystal module comprising the color filter substrate of claim 1.

4. The liquid crystal module of claim 3, further comprising:
    an array substrate disposed opposite to the color filter substrate,
    wherein an area of the array substrate corresponding to the touch flexible printed circuit binding area is transparent and configured with no circuits.

5. The liquid crystal module of claim 4, wherein the array substrate comprises a transparent base substrate.

6. The liquid crystal module of claim 5, further comprising:
    a first polarizer sheet disposed opposite to the color filter substrate and located on one side that is opposite to the other side on which the array substrate is located; and
    a second polarizer sheet disposed opposite to the array substrate and located on one side that is opposite to the other side on which the color filter substrate is located;
    wherein the first and second polarizer sheets have no areas that overlap or partially overlap the touch flexible printed circuit binding area.

7. The liquid crystal module of claim 4, further comprising:

a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located;

wherein the first and second polarizer sheets have no areas that overlap or partially overlap the touch flexible printed circuit binding area.

8. The liquid crystal module of claim 4, wherein an area of the array substrate corresponding to the touch flexible printed circuit binding area is transparent such that the touch flexible printed circuit binding area can be monitored from a side of the touch flexible printed circuit binding area which is configured for binding the touch flexible printed circuit.

9. The liquid crystal module of claim 3, further comprising:

a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located;

wherein the first and second polarizer sheets have no areas that overlap or partially overlap the touch flexible printed circuit binding area.

10. A touch display device, comprising the liquid crystal module of claim 3.

11. The liquid crystal module of claim 3, wherein the color filter substrate comprises a transparent base substrate and the bottom of the touch flexible printed circuit binding area is transparent.

12. The liquid crystal module of claim 11, further comprising:

an array substrate disposed opposite to the color filter substrate, wherein an area of the array substrate corresponding to the touch flexible printed circuit binding area is transparent and configured with no circuits.

13. The liquid crystal module of claim 12, wherein the array substrate comprises a transparent base substrate.

14. The liquid crystal module of claim 13, further comprising:

a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located;

wherein the first and second polarizer sheets have no areas that overlap or partially overlap the touch flexible printed circuit binding area.

15. The liquid crystal module of claim 12, further comprising:

a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located;

wherein the first and second polarizer sheets have no areas that overlap or partially overlap the touch flexible printed circuit binding area.

16. The liquid crystal module of claim 11, further comprising:

a first polarizer sheet disposed opposite to the color filter substrate and located on one side that is opposite to the other side on which the array substrate is located; and a second polarizer sheet disposed opposite to the array substrate and located on one side that is opposite to the other side on which the color filter substrate is located;

wherein the first and second polarizer sheets have no areas that overlap or partially overlap the touch flexible printed circuit binding area.

17. The liquid crystal module of claim 3, further comprising:

a backlight module, comprising a backlight shielding area, wherein the backlight shielding area is adjusted according to the display area.

18. The liquid crystal module of claim 17, wherein the backlight shielding area corresponds to the printed circuit binding area.

* * * * *